United States Patent
Zimmerman et al.

(10) Patent No.: US 6,566,768 B2
(45) Date of Patent: May 20, 2003

(54) TWO LINE SWITCH AND POWER SHARING FOR PROGRAMMABLE MEANS

(75) Inventors: Terry Zimmerman, Northridge, CA (US); Steve Dushane, Granada Hills, CA (US); Grant Bohm, Reseda, CA (US)

(73) Assignee: Venstar Inc.

( * ) Notice: Subject to any disclaimer, the term of this patent is extended or adjusted under 35 U.S.C. 154(b) by 37 days.

(21) Appl. No.: 09/737,451

(22) Filed: Dec. 14, 2000

(65) Prior Publication Data

US 2002/0074865 A1 Jun. 20, 2002

(51) Int. Cl.[7] .............................................. H01H 47/00
(52) U.S. Cl. ........................ 307/125; 307/140; 307/154
(58) Field of Search ............................... 307/125, 134, 307/154, 140

(56) References Cited

U.S. PATENT DOCUMENTS

| | | | | |
|---|---|---|---|---|
| 3,633,095 A | * | 1/1972 | Hood | 323/319 |
| 4,078,720 A | | 3/1978 | Nurnberg | |
| 4,086,466 A | * | 4/1978 | Scharlack | 219/494 |
| 4,109,134 A | * | 8/1978 | Van Herten | 219/216 |
| 4,161,022 A | * | 7/1979 | Kanazawa et al. | 219/661 |
| 4,776,514 A | | 10/1988 | Johnstone et al. | |
| 5,081,411 A | * | 1/1992 | Walker | 323/285 |
| 5,460,221 A | * | 10/1995 | Stalsberg et al. | 165/259 |
| 5,635,996 A | | 6/1997 | Tinsley et al. | |
| 5,831,349 A | * | 11/1998 | Weng | 307/125 |
| 5,847,555 A | * | 12/1998 | Lewis | 323/235 |
| 5,903,139 A | | 5/1999 | Kompelien | |
| 5,920,168 A | * | 7/1999 | Lewis | 110/101 C |

OTHER PUBLICATIONS

William L. Mostia, Jr. PE, Ground Loops and Their Cures, Control Engineering Online, Aug. 1, 1997.*
Tomi Engdahl, Ground loops and how to get rid of them, 1997–2000.*

* cited by examiner

Primary Examiner—Brian Sircus
Assistant Examiner—Sharon A. Polk
(74) Attorney, Agent, or Firm—David T. Bracken

(57) ABSTRACT

The present invention includes devices and methods for power sharing for a lower voltage programmable thermostat for operating a switch which operates at a substantially higher voltage. The present invention is preferably applied to two power line thermostat control of HVAC equipment. It is intended that the present invention be applicable to other such devices where power is stored by capacitance or in rechargeable batteries for use by lower voltage programmable thermostats while at the same time permitting sufficient current flow through a substantially higher power switch to operate directly or indirectly electrical power equipment.

6 Claims, 3 Drawing Sheets

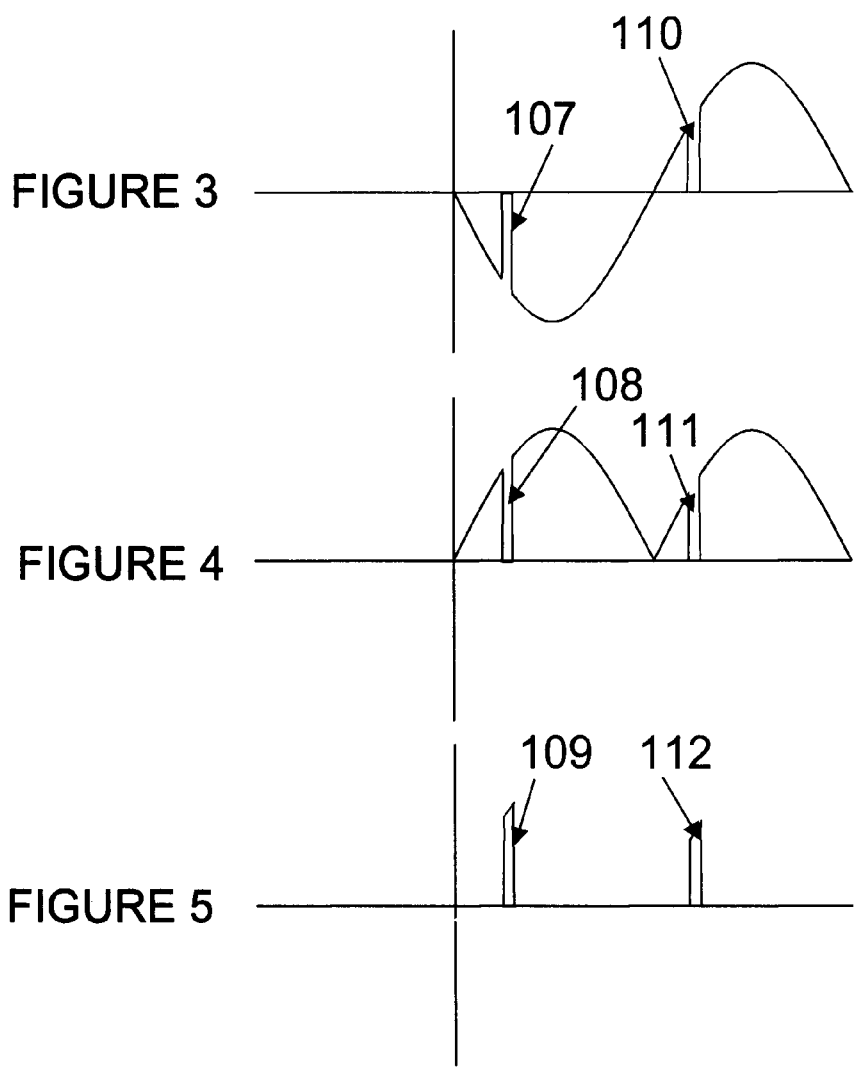

TWO LINE SWITCH AND POWER SHARING FOR PROGRAMMABLE MEANS

BACKGROUND OF THE INVENTION

The present invention relates to power sharing or "power stealing" for lower voltage control means concurrent with powering a local substantially higher voltage switch.

The prior art has demonstrated certain solutions to the problem of providing lower voltage and current thermostat control means on the same circuit as a substantially higher voltage and current switch which in turn activates HVAC equipment by direct line connection or by relay.

Means for relay line voltage (typically at about 24 vac) powering of the control means are described in U.S. Pat. Nos. 4,078,720 and 5,903,139. U.S. Pat. No. 4,078,720 describes a time variable set point thermostat adapted for use in a two-wire circuit of a heating or cooling system. Electric timer means are connected with a thermostat switch and starting relay means of a transformer having a primary and secondary winding periodically changing the set point of the thermostatic switch at selected intervals. The circuit is arranged to limit the current in the two-wire control circuit to a value less than that required to actuate the starting relay of the heating or cooling system in the two-wire control circuit with the thermostat switch open and to actuate the starting relay when the thermostat switch is closed when the ambient temperature to be regulated varies a determined amount from a selected temperature set point and the thermostatic switch is closed.

U.S. Pat. No. 5,903,139 describes a more sophisticated method of providing a zero point zone "stealing" of power so that enough power is taken for storage in high and low voltage capacitors while at the same time maintaining residual power passing to the relay to have continuous operation of heating equipment. A pair of power FETs are connected to the series power terminals, and the gates are controlled by logic and phase timers. FETs are turned off at the end of a phase, while a small amount of power sufficient to operate the control and circuitry is diverted to a power storage circuit, then the FETs are turned back without substantial interruption to the load. One embodiment uses a bi-directional charge pump to transfer power between low- and high-voltage power storage circuits. The circuit can operate with symmetrical or nonsymetrical AC or DC loads. It is significant for the concept of this patent that relatively precise timing of the zone about the zero point be predicted so that the "stealing" take place in the very low voltage zones of the continuous voltage curve so as not to cause the relay to be underpowered. The several circuit pieces required to achieve the described result in the patent are subject to failure or off specification operation, thereby increasing the likelihood that the patent device will fail or have a degraded performance. For instance, there are two sets of latches and phase timers critical to operation of the device, in addition to the two back to back FET's whose cooperative operation is critical to the switching function.

A line voltage solution is described in U.S. Pat. Nos. 4,776,514 and 5,635,896. U.S. Pat. No. 4,776,514 describes a two wire line voltage thermostat with first and second terminals for receiving line voltage power and for connection to a load, a transformer having a current primary winding, a voltage primary winding and a secondary winding, a primary controller connecting the current and voltage primary windings to the terminals, the controller having at least first and second states, the controller in the first state energizing both the current and voltage primary windings and in the second state energizing only the current primary winding, and a temperature responsive circuit connected to the secondary winding for controlling the controller between the first and second states in accordance with sensed temperature such that the load can be energized when the controller is in one of the states and can be deenergized when the controller is in the other of the states. Other prior art describe the unfavorable effect of having transformers associated with the thermostat in terms of increased heat generation, size and cost.

U.S. Pat. No. 5,635,896 describes a communication system with a remote switching module having two signal terminals connected by just two conductors to the signal terminals of a local decoding module. Power is directly provided only to the local decoding module, which applies DC voltage of a first level across the conductors. The remote switching module has a voltage regulator which provides power of a second voltage level lower than the first level for operating a control unit in the switching module. The control unit controls a variable impedance having higher and lower impedance levels and which is connected across the switching module's signal terminals. The decoding module can detect the different impedance levels by sensing the current flow on the conductors. The switching module communicates with the decoding module by modulating the time intervals between changes in impedance levels. It is clearly disadvantageous to require of two separated modules which results increased installation, manufacture and troubleshooting costs.

SUMMARY OF THE INVENTION

The present invention comprises means and methods for power sharing for a lower voltage programmable means for operating a switch which operates at a substantially higher voltage. The present invention is preferably applied to two power line thermostat control of HVAC equipment. Although a programmable thermostat is described in the specific description of the invention as the programmable means, it is intended that the present invention be applicable to other such devices where power is stored by capacitance or in rechargeable batteries for use by lower voltage programmable means while at the same time permitting sufficient current flow through a substantially higher power switch to operate directly or indirectly electrical power equipment. The present invention may be used in the presence of more than two power lines to accomplish HVAC equipment operating, the additional lines being used for other functions.

The present invention is a dramatic simplification of the overly populated circuit of U.S. Pat. No. 5,903,139. The present invention connects the two power lines described above (connected to a low voltage relay or to line voltage) to a bridge rectifier, the output connections of which are connected to a common through the drain and source of an FET. The gate of the FET is activated by a signal from the programmable means, which then causes the current to flow (switches on) through the two power lines to power the relay or directly power the HVAC equipment. The drain of the FET is also connected with power storage means, voltage regulation means and the programmable means. The additional connected means function so that, when the HVAC equipment is operating by FET gate activation, the FET for a very short interval operates to stop current through the source and drain, thereby stopping current flow for a very short interval to the HVAC equipment, thereby delivering DC voltage and current to the power storage means, voltage regulation means and the programmable means. The programmable means preferably operate on power from the power storage means, so that when the HVAC equipment is operating the power storage means are being depleted of power by the programmable means, requiring recharging of the power storage means by shutting off the power to the HVAC equipment for a very short interval so that the power storage means are recharged at least in part.

It is preferable to provide sensing means so that the programmable means may determine an appropriate portion of the alternating current curve from which to take its very short interval of power sharing. The present invention preferably obtains a short and timed portion of DC power from the AC power line inputs substantially after the AC voltage curve rises above or below zero but substantially before the maximum positive or negative voltage is reached.

It is also preferable that when the HVAC equipment is shut off, i.e., the programmable means deactivates the FET so that no current flows to the HVAC equipment directly or indirectly, the power from the two power lines is directly usable by the programming means through a voltage regulation means.

BRIEF DESCRIPTION OF THE DRAWINGS

FIG. 3 is a graph of voltage across the bridge rectifier when the HVAC is required to be operating.

FIG. 4 is a graph of voltage across the FET when the HVAC is required to be operating.

FIG. 5 is a graph of voltage to the voltage storage means when the HVAC is required to be operating and power is being shared.

DETAILED DESCRIPTION OF THE INVENTION

The invention is now discussed with reference to the Figures.

Figure 1:
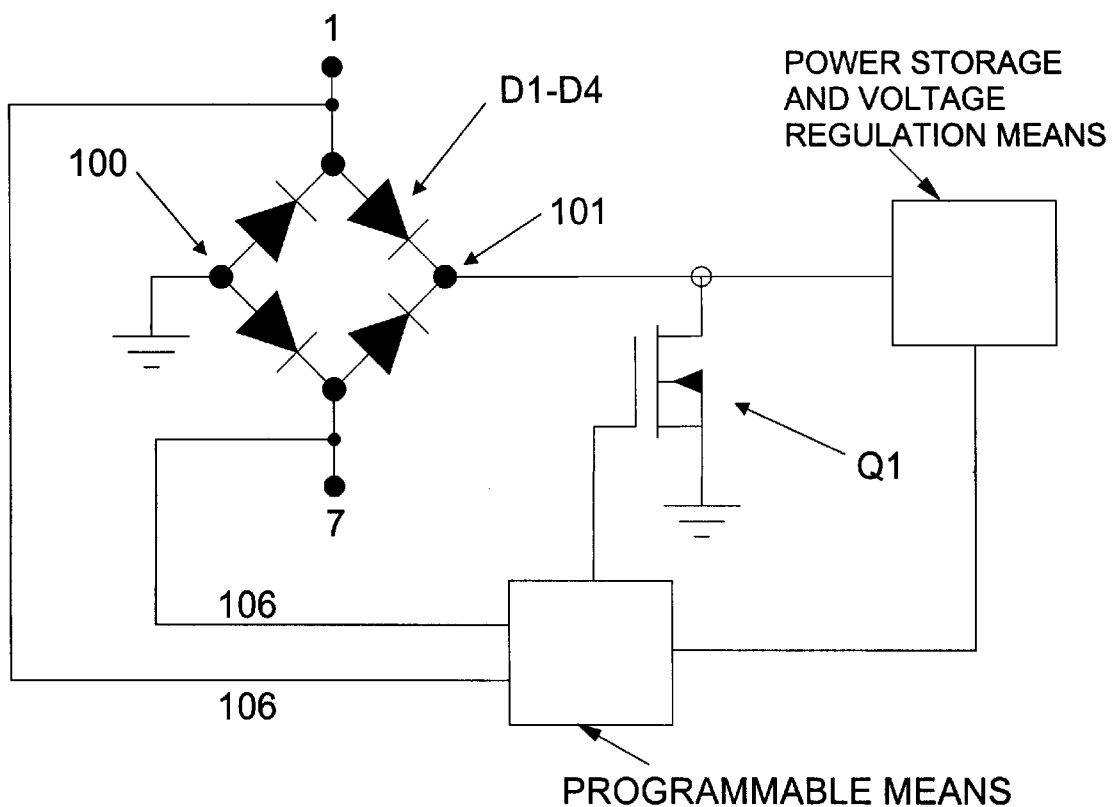
FIG. 1 is a schematic and block diagram of the invention in its simplest form.

FIG. 1 shows two power lines 1 and 7 connected with rectifier D1–D4 at the AC input terminals. The DC output terminals 100 and 101 are respectively connected with a common ground (corresponding to connection 5 of the JP1 HEADER of FIG. 2) and the drain of FET Q1, the source of which is connected with the common ground. Bridge rectifier D1–D4 preferably comprised of Schottkey barrier diodes for quick response as required by the objects of this invention.

It is preferable that connections (not shown in FIG. 1) be made to the AC connections of rectifier D1–D4 to input to the programmable means the continuous voltage changes of the power lines during "on" periods of the HVAC equipment. The programmable means then may cause FET Q1 to deactivate and reactivate current flow in this process of power sharing with the HVAC equipment. It is well known that power supply in the common 24/120/240 vac comprises substantial and measurable "noise" in the form of voltage spikes and drops and that relays for and HVAC equipment itself is designed to continue operating irrespective of this line "noise". The skilled person is thus informed with this disclosure that the power sharing intervals of the present invention may be as long as the longest permissible power drop which the relay for or HVAC equipment itself will experience as negligible "noise" without affecting the operation of the HVAC equipment. The interval is preferably chosen from a zone of about 20% to 80% of maximum positive or negative voltage in the alternating power line voltage. In such an interval range, the present invention is clearly distinguished from the preferred interval of U.S. Pat. No. 5,903,139 about the zero point. In the typical 50–60 Hz current supplied to residential and many commercial users, a half cycle is about 0.0083 seconds, the sharing period of which is preferably about 10–20% of the half cycle time before peak voltage.

FIG. 1 shows that the gate of FET Q1 is connected to programmable means 103, while its drain is connected to power storage and voltage regulation means 102. It will be understood by inspection of FIG. 2 and this description that means 102 and 103 are effectively connected for cooperative action according to the objects of the invention.

Figure 2:
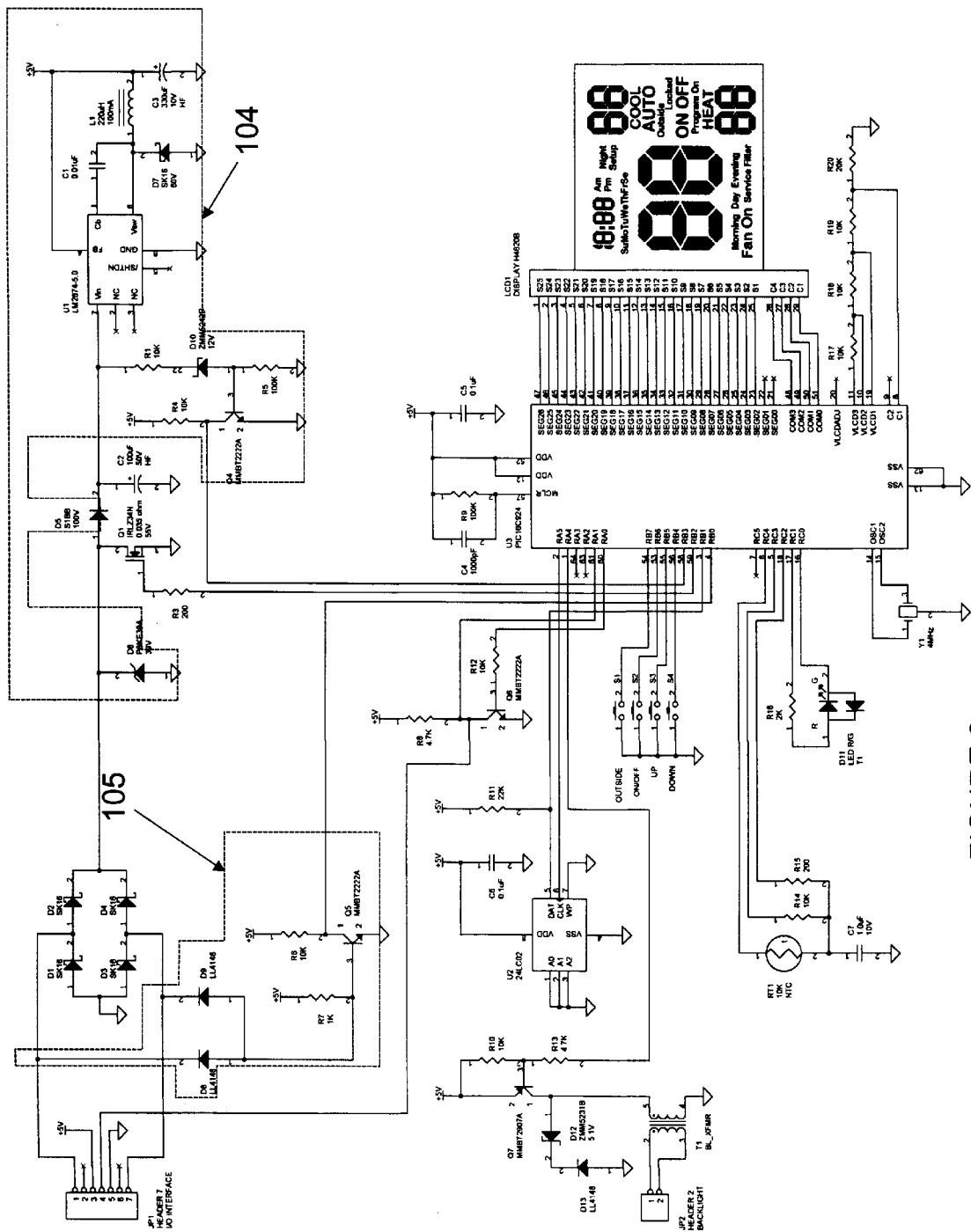
FIG. 2 is a complete schematic diagram of a specific embodiment of the invention comprising a programmable thermostat as the programmable means together with power storage means and voltage regulation means.

FIG. 2 is a specific example of the present invention whereby many of the circuit elements and operations are in IC U3, a part of the programmable means. In FIG. 2, the two power lines 1 and 7 are shown connecting with the invention devices at the header JP1, and, as in FIG. 1, rectifier D1–D4 is connected at its AC inputs to the lines 1 and 7 and FET Q1 is connected at its drain to the positive DC connection of rectifier D1–D4. Lines 1 and 7 are respectively connected to diodes D8 and D9 to provide power line voltage sensing connections with IC U3. Thus the programmable means receive continuous inputs on the voltage of the power lines 1 and 7 so that an appropriate shut off interval may be applied when the invention switch is in the "on" mode.

The drain of FET Q1 is connected through diode D5 to power storage capacitor C2. It is capacitor C2 which charges to capacity without restriction when the invention switch is in the "off" mode and receives the DC charge during the short intervals when the power line current is shut off when the invention switch is in the "on" mode. The prgrogrammable means draw power from capacitor C2 for their operation when power line power is not directly available, i.e., the invention switch is in the "on" mode. Other functions of the programmable means are more fully described in U.S. Pat. No. 6,134,134 to Dushane et al, including temperature sensing and response with various modes of operation of HVAC equipment as appropriate with a two line thermostat.

Voltage regulation means 104 are shown in FIG. 2 as comprising several circuit elements connected to the logic means for providing power thereto from the voltage storage means (in the case of FIG. 2, from the capacitor C2). It will be within the ability of the skilled person to adapt these elements so that inputs 1 and 7 may be operated at line voltage or reduced voltage as is described above. Voltage sensing input means 105 in FIG. 2 shows that the programmable means optionally includes voltage sensing input means 105 (as in FIG. 2) with which to sense the voltage across rectifier D1–D4 when the FET is activated in the "on" mode. Voltage sensing input means 105 has connections 106 as in FIG. 1 so that the programmable means detects voltage levels across rectifier D1–D4 such that FET Q1 is switched on and off at times appropriate to achieve the objects of the invention.

In a general description of the voltage levels of the invention, FIGS. 3–5 show the effect of switching FET Q1 off and on at respectively sections 107 and 110, 106 and 111 and 109 and 112. The present invention eliminates the requirement for the many circuit elements of U.S. Pat. No.

5,903,139 that are required for its objects, i.e., extreme precision and care must be exercised to sample a very narrow range of voltage levels into the voltage storage capacitors. FIG. 3 in section 107 shows that FET Q1 is caused to shut off positive alternating current flow through the rectifier D1–D4 for about 5% of the half cycle time and then to re-activate. Section 110 in FIG. 3 shows that such switching is accomplished for the negative alternating current flow through the rectifier D1–D4 for about 5% of the half cycle time. FIG. 4 shows that the rectified DC voltage is shut off through sections 108 and 111. The power from those switched off periods 109 and 112 as in FIG. 5 is diverted to voltage storage means. Voltage in the present invention is preferably shared at a substantial distance from the zero point on the voltage curve as opposed to the focus on that section of the voltage curve in U.S. Pat. No. 5,903,139. The voltage storage and regulation means may be adapted such that power sharing may be accomplished in the present invention close to the zero point, i.e., on either side of the zero point or on either side of the maximum voltage. The present invention provides a direct current input to the voltage storage means by FET induced shunting from the bridge rectifier that acts with the FET as the circuit switch to turn HVAC equipment on and off.

The above design disclosures present the skilled person with considerable and wide ranges from which to choose appropriate obvious modifications for the above examples. However, the objects of the present invention will still be obtained by the skilled person applying such design disclosures in an appropriate manner.

We claim:

1. A process for sharing power to a lower voltage programmable means for controlling a substantially higher voltage switch means for turning on and off electrical equipment comprising:

(a) two power lines connected with an alternating current source at the substantially higher voltage such that, upon completion of a power circuit between the two power lines, the electrical equipment operates;

(b) a bridge rectifier connected between the two power lines at two AC connections of the rectifier, the bridge rectifier further connected at one of its DC terminals to a common ground;

(c) a field effect transistor connected at its drain to the second of the DC connections of the rectifier, a source of the field effect transistor connected to a common ground and a gate of the field effect transistor connected to a programmable means adapted to activate and deactivate the field effect transistor to respectively complete or break the power circuit;

(d) power storage means for storing power from the alternating current source and supplying temporarily the power needs of the programmable means;

(e) voltage regulation means connected with the programmable means for reducing the substantially higher voltage to the lower voltage for use by the programmable means, the voltage regulation means further connected with the power storage means such that power is directed from the power storage means to the programmable means;

(f) the programmable means sensing a change making desirable of the electrical equipment, the programmable means then being capable of completing the power circuit and turn on the electrical equipment;

(g) deactivating and then reactivating the field effect transistor during which time charge is stored in the power storage means from the alternating current source but the electrical equipment continues to operate; and (h) programmable means comprises means for sensing the voltage of the alternating current across the rectifier, whereby programmable means selects the deactivation to reactivation time of step (g) to be substantially away from a zero point of the voltage of the alternating current.

2. The process of claim 1 wherein step (g) is performed at least at every other half cycle of the voltage of the alternating current.

3. The process of claim 2 wherein step (g) is preformed at least at every half cycle of the voltage of the alternating current.

4. The process of claim 2 wherein the power storage means is one or more capacitors in parallel.

5. A process for sharing power to a lower voltage programmable means for controlling a substantially higher voltage switch means for turning on and off electrical equipment comprising:

(a) two power lines connected with an alternating current source at the substantially higher voltage such that, upon completion of a power circuit between the two power lines, the electrical equipment operates;

(b) a bridge rectifier connected between the two power lines at two AC connections of the rectifier, the bridge rectifier further connected at one of its DC terminals to a common ground;

(c) a field effect transistor connected at its drain to the second of the DC connections of the rectifier, a source of the field effect transistor connected to a common ground and a gate of the field effect transistor connected to a programmable means adapted to activate and deactivate the field effect transistor to respectively complete or break the power circuit;

(d) power storage means for storing power from the alternating current source and supplying temporarily the power needs of the programmable means;

(e) voltage regulation means connected with the programmable means for reducing the substantially higher voltage to the lower voltage for use by the programmable means, the voltage regulation means further connected with the power storage means such that power is directed from the power storage means to the programmable means;

(f) the programmable means sensing a change making desirable operation of the electrical equipment, the programmable means then being capable of completing the power circuit and turn on the electrical equipment;

(g) deactivating and then reactivating the field effect transistor during which time charge is stored in the power storage means from the alternating current source but the electrical equipment continues to operate; and (h) programmable means comprises means for sensing the voltage of the alternating current across the rectifier, whereby programmable means selects the deactivation to reactivation time of step (g) to be after a zero point of the voltage of the alternating current and after the voltage has risen to above about 12 volts.

6. A process for sharing power to a lower voltage programmable means for controlling a substantially higher voltage switch means for turning on and off electrical equipment comprising:

(a) two power lines connected with an alternating current source at the substantially higher voltage such that, upon completion of a power circuit between the two power lines, the electrical equipment operates;

(b) a bridge rectifier connected between the two power lines at two AC connections of the rectifier, the bridge rectifier further connected at one of its DC terminals to a common ground;

(c) a field effect transistor connected at its drain to the second of the DC connections of the rectifier, a source of the field effect transistor connected to a common ground and a gate of the field effect transistor connected to a programmable means adapted to activate and deactivate the field effect transistor to respectively complete or break the power circuit;

(d) power storage means for storing power from the alternating current source and supplying temporarily the power needs of the programmable means;

(e) voltage regulation means connected with the programmable means for reducing the substantially higher voltage to the lower voltage for use by the programmable means, the voltage regulation means further connected with the power storage means such that power is directed from the power storage means to the programmable means;

(f) the programmable means sensing a change making desirable operating of the electrical equipment, the programmable means then being capable of completing the power circuit and turn on the electrical equipment;

(g) deactivating and then reactivating the field effect transistor during which time charge is stored in the power storage means from the alternating current source but the electrical equipment continues to operate; and (h) programmable means comprises means for sensing the voltage of the alternating current across the rectifier, whereby programmable means selects the deactivation to reactivation time of step (g) to be after a maximum of the voltage of the alternating current but before zero point of that voltage.

* * * * *